United States Patent
Bartel

(10) Patent No.: US 8,955,832 B1
(45) Date of Patent: Feb. 17, 2015

(54) SEAT SUSPENSION FOR TERRAIN WORKING VEHICLES

(71) Applicant: Harlan John Bartel, North Newton, KS (US)

(72) Inventor: Harlan John Bartel, North Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 13/827,508

(22) Filed: Mar. 14, 2013

Related U.S. Application Data

(60) Provisional application No. 61/768,839, filed on Feb. 25, 2013.

(51) Int. Cl.
*F16F 7/00* (2006.01)
*B60N 2/38* (2006.01)

(52) U.S. Cl.
CPC ........................................ *B60N 2/38* (2013.01)
USPC ............... 267/141.3; 267/140.3; 267/131; 267/133; 248/634; 248/636; 297/452.49

(58) Field of Classification Search
USPC ............ 267/131, 133, 140.3, 141.3; 248/634, 248/636; 297/307, 452.49
See application file for complete search history.

(56) References Cited

U.S. PATENT DOCUMENTS

| | | | |
|---|---|---|---|
| 2,833,367 A | 5/1958 | Pool et al. | |
| 3,123,380 A | 3/1964 | Grim et al. | |
| 3,182,605 A | 5/1965 | Brasher | |
| 3,328,085 A * | 6/1967 | Schwartz et al. | 297/452.49 |
| 3,347,558 A | 10/1967 | Grimes et al. | |
| 3,429,568 A | 2/1969 | Alford, Jr. | |
| 3,616,709 A | 11/1971 | Malm | |
| 3,732,941 A | 5/1973 | Davis et al. | |
| 3,770,235 A * | 11/1973 | Klapproth et al. | 248/634 |
| 3,774,711 A | 11/1973 | Lacey | |
| 3,841,429 A | 10/1974 | Falcone et al. | |
| 3,917,210 A | 11/1975 | Miller | |
| 3,933,224 A | 1/1976 | Nilsson et al. | |
| 3,948,341 A | 4/1976 | Foster | |
| 4,055,230 A | 10/1977 | Kestian | |
| 4,057,214 A * | 11/1977 | Harder, Jr. | 248/634 |
| 4,061,393 A | 12/1977 | Blomstrom | |
| 4,141,429 A | 2/1979 | Hale | |
| 4,210,362 A | 7/1980 | Boersma | |
| 4,235,470 A | 11/1980 | Kauss et al. | |
| 4,311,204 A * | 1/1982 | Shupert | 180/54.1 |
| 4,330,149 A | 5/1982 | Salmon | |
| 4,353,594 A * | 10/1982 | Lowe | 297/307 |
| 4,392,546 A | 7/1983 | Brown et al. | |
| 4,418,955 A | 12/1983 | Muncke et al. | |
| 5,265,690 A * | 11/1993 | Amundsen et al. | 180/89.1 |
| 5,364,114 A | 11/1994 | Petersen | |
| 5,367,864 A | 11/1994 | Ogasawara et al. | |
| 5,368,118 A | 11/1994 | Hoefle | |
| 5,433,066 A | 7/1995 | Wenzel et al. | |
| 5,799,475 A | 9/1998 | Borling et al. | |

(Continued)

*Primary Examiner* — Christopher Schwartz

(57) ABSTRACT

An operator seat suspension apparatus includes a seat having a seat structure including longitudinal, upright flanges and a vehicle having a frame including longitudinal, upright flanges spaced away from the longitudinal, upright flanges of the seat structure. A set of isolators is fixed to and connects between the upright flanges of the seat structure and the upright flanges of the vehicle frame. The isolators are adapted to allow displacement in shear in the vertical and the longitudinal directions in response to shock forces in either direction.

6 Claims, 6 Drawing Sheets

(56) References Cited

U.S. PATENT DOCUMENTS

| | | |
|---|---|---|
| 5,803,474 A | 9/1998 | Klas et al. |
| 5,865,020 A | 2/1999 | Busboom et al. |
| 5,873,224 A | 2/1999 | Murakawa et al. |
| 5,946,893 A | 9/1999 | Gordon |
| 6,062,333 A | 5/2000 | Gordon |
| 6,168,229 B1 | 1/2001 | Kooi et al. |
| 6,170,242 B1 | 1/2001 | Gordon |
| 6,206,121 B1 | 3/2001 | Michel |
| 6,244,025 B1 | 6/2001 | Ferris et al. |
| 6,276,119 B1 | 8/2001 | Oshima et al. |
| 6,394,216 B1 | 5/2002 | Gordon |
| 6,460,318 B1 | 10/2002 | Ferris et al. |
| 6,467,581 B2 | 10/2002 | Bavendiek et al. |
| 6,478,102 B1 | 11/2002 | Puterbaugh et al. |
| 6,510,678 B2 | 1/2003 | Ferris et al. |
| 6,669,293 B2 | 12/2003 | Moore |
| 6,698,172 B2 | 3/2004 | Ferris et al. |
| 6,711,885 B2 | 3/2004 | Ferris |
| 6,811,227 B2 * | 11/2004 | Andersson et al. ...... 297/452.49 |
| 6,857,254 B2 | 2/2005 | Melone et al. |
| 6,899,720 B1 | 5/2005 | McMillan |
| 7,107,746 B2 | 9/2006 | Melone et al. |
| 7,152,389 B2 | 12/2006 | Melone et al. |
| 7,287,810 B2 | 10/2007 | Ishii et al. |
| 7,374,187 B2 | 5/2008 | Melone et al. |
| 7,546,723 B2 | 6/2009 | Melone et al. |
| 7,695,054 B2 | 4/2010 | Haeusler |
| 7,708,292 B2 | 5/2010 | Foster |
| 2,422,813 A1 | 7/2010 | Cook et al. |
| 7,882,914 B2 | 2/2011 | Scheele et al. |
| 7,924,224 B2 | 4/2011 | LaFever et al. |
| 7,950,727 B2 | 5/2011 | Haeusler |
| 8,065,864 B2 | 11/2011 | Melone et al. |
| 8,118,288 B2 | 2/2012 | Caya et al. |
| 8,132,822 B2 | 3/2012 | Nance |
| 8,146,899 B2 | 4/2012 | Hiser |
| 8,167,324 B2 | 5/2012 | Piontek |
| 8,182,024 B2 | 5/2012 | Hayes et al. |
| 8,186,475 B2 | 5/2012 | Sugden et al. |
| 8,245,806 B2 | 8/2012 | Newell |
| 2008/0196374 A1 | 8/2008 | Gamble et al. |
| 2009/0184448 A1 * | 7/2009 | Hiser ...................... 267/140.11 |
| 2009/0308039 A1 | 12/2009 | Marshall et al. |
| 2012/0279192 A1 | 11/2012 | Newell |

* cited by examiner

SEAT SUSPENSION FOR TERRAIN WORKING VEHICLES

CROSS REFERENCES TO RELATED APPLICATIONS

This application claims the benefit of U.S. Provisional Patent Application No. 61/768,839 filed on Feb. 25, 2013, which is incorporated herein by reference.

FIELD

This invention relates to an apparatus for suspending an operator's seat for a working vehicle that traverses moderately rough terrain such as a riding mower.

BACKGROUND

Riding mowers and other vehicles that traverse moderately rough terrain have long been known for transmitting vibrations to the operator. This problem is particularly acute for riding mowers. Because riding mowers must follow terrain variations in order to properly cut turf and because the cutting decks of riding mowers are typically carried by the frame of a riding mower. Because of this, when riding mowers do have suspension systems between the wheels and the frame, the range of relative motion between the wheels and the frame are usually limited so that the quality of the cut is not compromised. Accordingly, various suspension systems have been interposed between mower frames and operator seats or operator platforms in order to isolate operators from terrain variations. All suspension systems rely on the fundamental property of inertia. Accordingly, if the operator and the operator's seat can be at least partially decoupled from the vehicle frame, then the operator and the operator's seat would generally continue their motion and direction of motion regardless of sudden variations in the path of the mower. Further, since the direction of motion of a riding mower is generally in the longitudinal or "x" direction, the path variations which are most likely to cause discomfort for an operator are in the vertical or "y" direction as well as, and nearly as importantly, in the longitudinal or "x" direction. The ability to absorb displacements in the longitudinal or "x" direction is particularly important for riding mowers having relatively short wheel bases. When such "short coupled" riding mowers encounter a bump, the mower will suddenly rotate about a generally transverse axis causing "back slap" (when the back of the operator seat to slaps the operators back). If the operator's seat can translate in the longitudinal direction, then back slap can be reduced. Yet, most prior art riding mower suspension systems employ a spring element which compresses only in response to vertical forces. Also, suspension systems having compression springs or elastomeric compression elements usually have a limited range of motion. Accordingly, what is needed is an operator seat suspension system that is compliant in the vertical or "y" direction, as well as being compliant in the longitudinal or "x" direction and with a generous range of motion in both the "x" and "y" directions. Further, it would be advantageous if such a suspension system had a means for dampening responsive relative motions between the operator seat and the vehicle frame in the vertical or "y" direction and in the longitudinal or "x" direction.

SUMMARY

An operator seat suspension system for vehicles that traverse moderate rough terrain includes an operator seat and a suspension system interposed between the operator seat and the frame of the vehicle. The suspension system includes transverse elastomeric isolators which connect between first members fixed to a seat frame and second members fixed to a vehicle frame. An optional dampener may be connected between a member fixed to the vehicle frame and the seat. The elastomeric isolators connect transversely between the seat frame flanges and the vehicle frame flanges. The isolators are not adapted to deform in compression but are adapted to respond in shear to both vertical and longitudinal forces. The isolators are arranged to be relatively unresponsive either in compression or tension. Thus, compliance in the transverse direction, which results in either compression or tension in the isolators, is significantly less than compliance in either the longitudinal or vertical directions. Accordingly, in this example, the seat may move up and down in response to sudden vertical accelerations or forward and back in response to sudden longitudinal accelerations but will be significantly less responsive to the relatively less common side to side accelerations. However, as noted above, such side to side accelerations are not significant during normal operations.

In this example, an optional dampener may be connected between the seat and the vehicle frame and is oriented to primarily dampen vertical displacements and to a lesser degree, longitudinal displacements. Thus, the dampener is adapted to rapidly reduce cyclic displacements of the seat relative to the frame, particularly if those cyclic displacements are in the vertical direction.

The overall effect of the suspension system described above is to allow the operator to move along a path that will have vertical displacements but will have vertical displacements that are smoother and more gradual than the vertical displacements experienced by the vehicle frame when the vehicle frame is traversing an uneven surface. Moreover, while the vehicle may rock and tip about a transverse axis, the suspension system will tend to prevent the seat from changes in orientation in response to the sudden or rapid oscillations of the vehicle frame as the vehicle traverses an uneven surface, such as a washboard surface. Yet the suspension system will permit the seat to change its orientation, by following the orientation of the vehicle frame, in response to more gradual changes in pitch as might occur when the vehicle begins to climb a slope.

DETAILED DESCRIPTION

Figure 1:
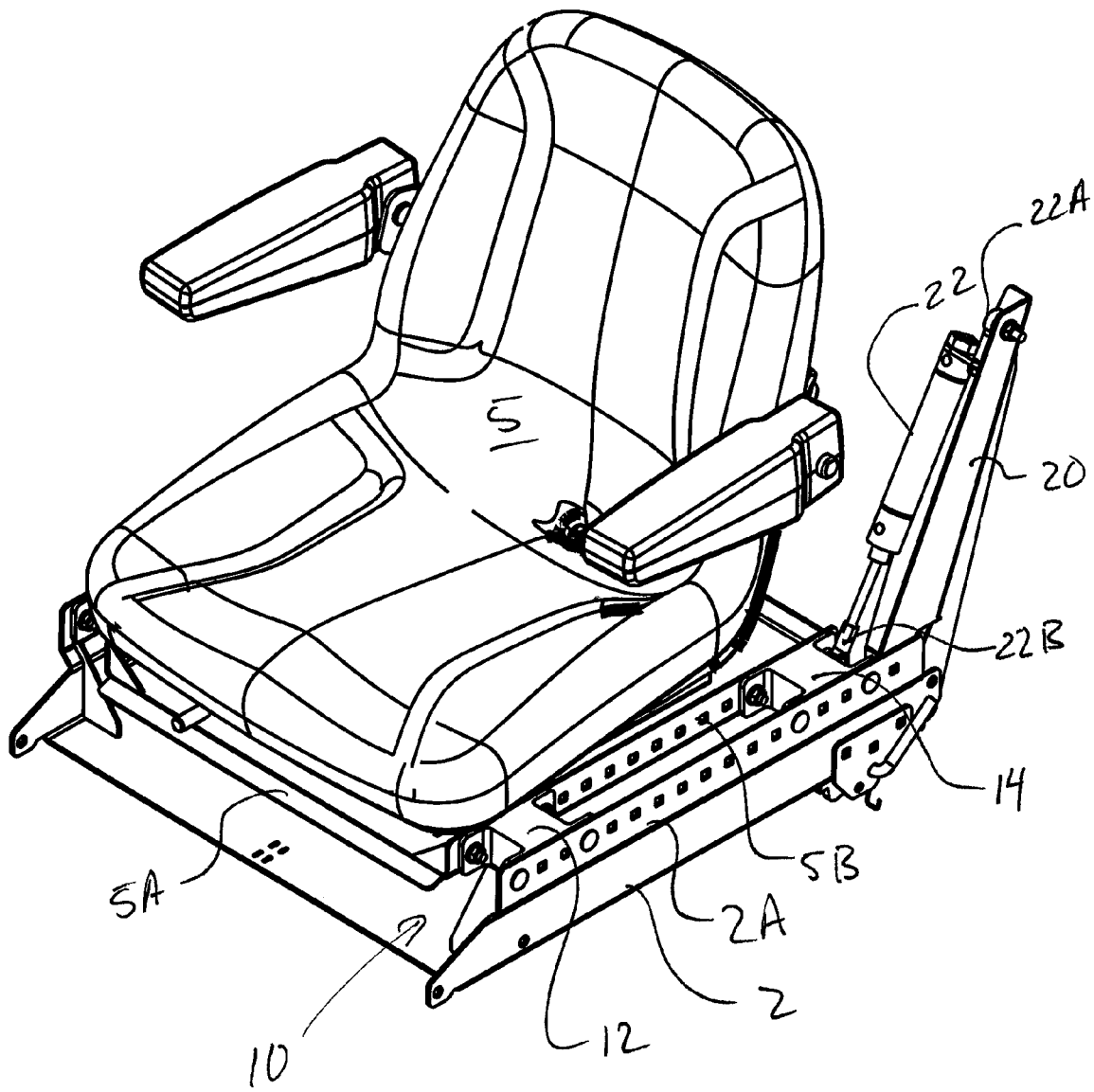
FIG. 1 is a perspective view of an operator seat mounted to a vehicle frame with the present suspension system.
Figure 2:
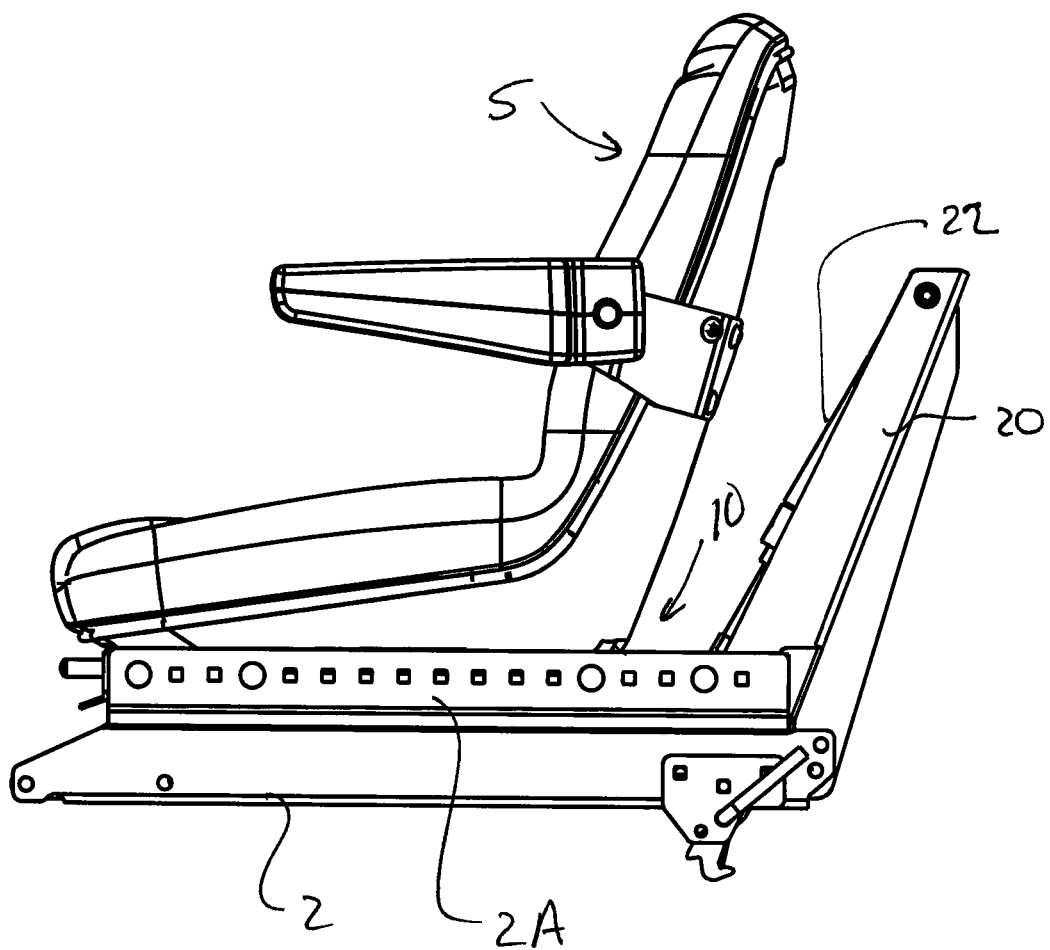
FIG. 2 is a side view of an operator seat mounted to a vehicle frame with the present suspension system.
Figure 3:
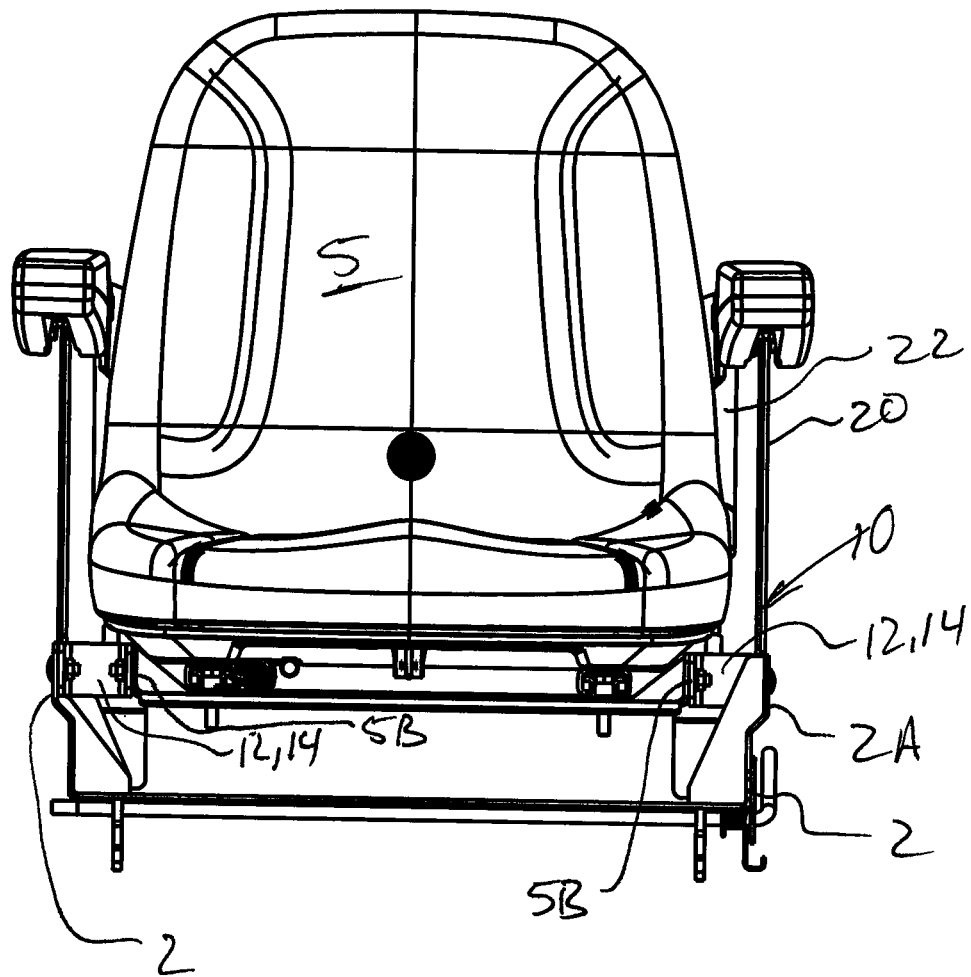
FIG. 3 is a front view of an operator seat mounted to a vehicle frame with the present suspension system.

Referring to the drawings, FIGS. 1-4 illustrate a vehicle operator seat 5 mounted to a vehicle frame 2 with a suspension system 10 interposed between seat 5 and vehicle frame 2. In this example, vehicle frame 2 is a portion of the frame of a working vehicle for traversing moderately rough terrain such as a riding mower. Those skilled in the art will readily understand the general configuration of a vehicle such as a riding mower and will readily understand the types of displacements experienced by a riding mower during typical operations as the mower traverses moderately rough terrain. Seat suspension system 10 generally includes isolators 12 and 14 generally connecting between seat 5 and vehicle frame 2 and dampeners 22 which also generally connect between a structure connected to vehicle frame 2 and operator seat 5.

As can be seen in FIG. 1, in this example, operator seat 5 is rigidly mounted to a seat pan 5A which presents two spaced apart generally longitudinal, upright seat flanges 5B. In this example seat flanges 5B extend from the forward end of seat 5 toward the back of seat 5. Yet, the skilled reader should understand that seat flanges 5B are shown and described here by way of example only. Seat flanges 5B should be understood as structural members which are at least indirectly mounted to seat 5 and which are fixed in relation to seat 5. Vehicle frame 2 includes two spaced apart generally longitudinal, upright frame flanges 2A which are generally parallel to and spaced away from seat flanges 5B. In this example, frame flanges 2A are shown to be spaced outboard of seat flanges 5B but could also be spaced inboard of seat flanges 5B. Further, the skilled reader should understand that upright frame flanges 2A are merely examples of suitable members for mounting isolators 12 and 14 to a vehicle. Upright frame flanges 2A should be understood as any structural member which presents a suitable, generally upright longitudinal surface for mounting an isolator which is either part of a vehicle frame or which can be mounted to a vehicle frame and fixed in relation to a vehicle frame. In this example, elastomeric isolators 12 and 14, including forward isolators 12 and rear isolators 14, are located adjacent to the forward and rear ends of seat 5 respectively and extend transversely and connect between frame flanges 2A and seat flanges 5B. Thus, isolators 12 and 14 extend transversely and are adapted to deform in shear in response to vertical forces between a neutral position shown in FIG. 5A and a downwardly displaced position shown in FIG. 5D. It is also possible, should frame 2A suddenly accelerate downward, for isolator 12 to deform in an upwardly displaced manner as shown in FIG. 5C. Further, to a different degree, with a different spring rate, isolators 12 and 14 are capable of deforming in shear in response to longitudinal forces between a neutral position shown in FIG. 6A, a forward position shown in FIG. 6C and a rearwardly displaced position shown in FIG. 6B.

One of isolators 12 is shown in detail in FIGS. 5A-6C. The skilled reader should understand that isolator 12 is generally similar in design to isolator 14. As can be better seen in FIGS. 5A-6C, isolator 12 includes an outboard flange 12A, an elastomeric isolator body 12B and an inboard flange 12C. Isolator body 12B is bonded to flanges 12A and 12C by a strong, durable adhesive. In this example, outboard and inboard flanges 12A and 12C are flat plates which, in this example, are fashioned from a strong material such as steel or a high grade aluminum alloy. Flanges 12A and 12C may be replaced by L shaped brackets or the like as long as generally upright flanges are present for supporting isolator body 12B. In this example, four fasteners 12F fasten flanges 12A and 12C to frame flange 2A and seat flange 5B respectively. The purpose of these structural elements is to mount an isolator, on one side of the isolator, to a generally first upright, longitudinal surface of a member which is fixed in relation to seat 5 and to also mount the isolator, on its opposite side, to a second upright, longitudinal surface of a member which is fixed in relation to the vehicle frame.

As noted above, isolators 12 and 14 may be configured to have differing spring rates in the vertical and longitudinal directions. By way of example, isolators 12 and 14 may be configured so that an operator weighing 200 lbs will notice that seat 5 translates down approximately ½ or 2 inches when the operator sits in seat 5. Thus, all four isolators may have a combined spring constant in the vertical direction of approximately between 100 to 200 lbs/inch. A different spring rate may be selected for the longitudinal direction. Isolators 12 and 14 are much less responsive to transverse or side to side forces. However, if vehicle frame 2 was to suddenly rock or rotate about a longitudinal axis (when, for example, wheels on one side of the vehicle encounters a bump), isolators 12 and 14 on one side would deflect downwardly while isolators 12 and 14 on the opposite side might deflect upwardly or at least deflect toward the neutral position under the weight of an operator thereby allowing seat 5 to generally remain in its orientation during such rocking motion. As can be appreciated by those skilled in the art, a riding mower is not likely to experience significant sudden side to side (transverse) displacements.

Figure 4:
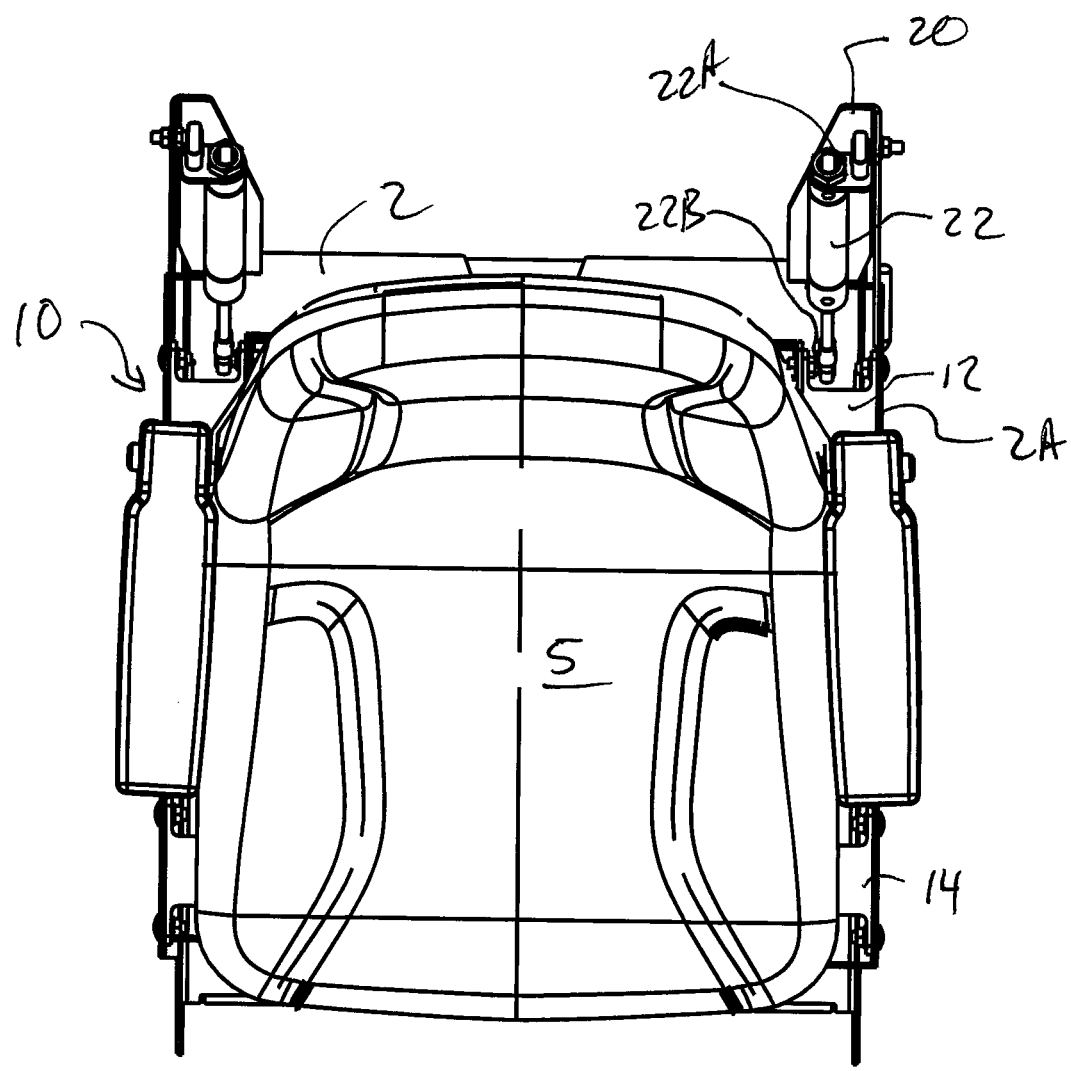
FIG. 4 is a top view of an operator seat mounted to a vehicle frame with the present suspension system.
Figure 5A:
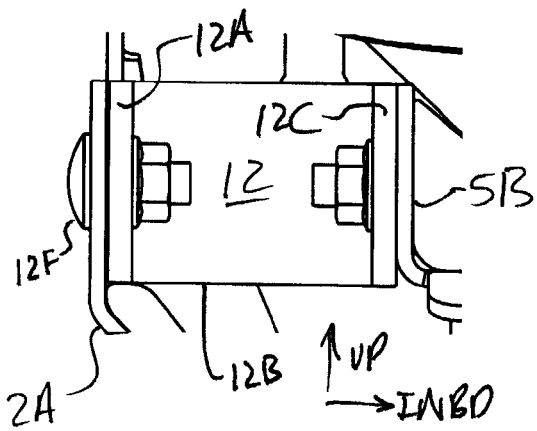
FIG. 5A is a front view of an isolator in a first neutral position.
Figure 5B:
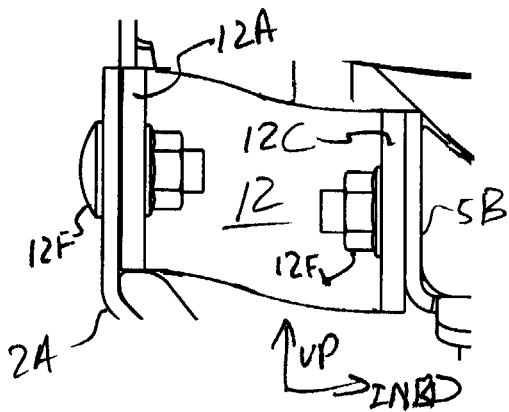
FIG. 5B is a front view of an isolator in a second downwardly deflected position as might occur with the added weight of an operator.
Figure 5C:
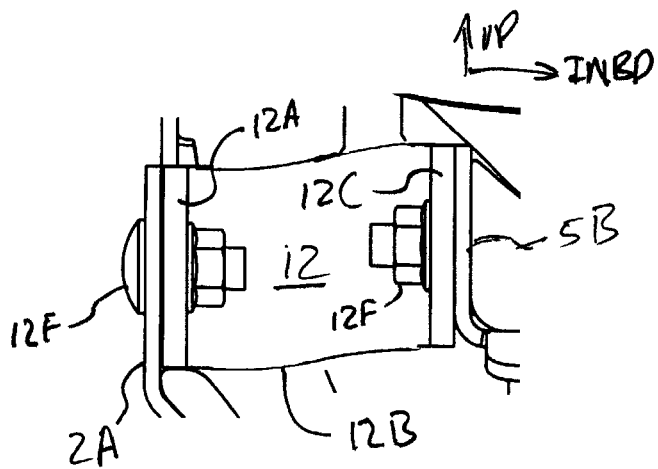
FIG. 5C is a front view of an isolator in a third upwardly deflected position as might occur if the frame of the vehicle were to suddenly translate down relative to the operator seat.
Figure 5D:
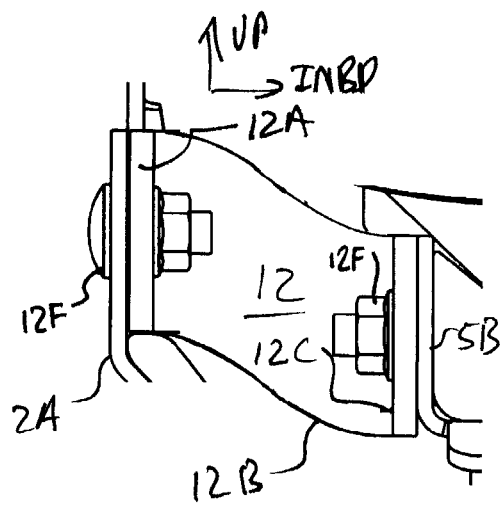
FIG. 5D is a front view of an isolator in a fourth downwardly deflected position as might occur if the frame of the vehicle were to suddenly translate up due to a sudden bump.

Various deflection modes for isolators 12 and 14 are shown in FIGS. 4 and 5A-5C. Since the deflection modes of isolators 14 are essentially identical to the deflection modes of isolators 12, the deflection modes for right front isolator 12 are shown in FIGS. 5A-6C. FIGS. 5A-5D illustrate what occurs when relative vertical displacements occur between vehicle frame 2A and seat frame 5B. As can be seen in FIG. 5A, which is a front view of isolator 12, isolator 12 is in a first neutral position as might occur when the vehicle is not moving and operator seat 5 is empty. In FIG. 5B, isolator 12 is in a second downwardly deflected position as might occur when an operator is sitting in seat 5. In FIG. 5C, isolator 12 is in a third upwardly deflected position as might occur if the vehicle is in motion and frame 2A suddenly translates downwardly. And finally, in FIG. 5D, isolator 12 is in a fourth downwardly deflected position in which seat frame 5B is displaced downwardly to a degree which is larger than in the second downwardly deflected position shown in FIG. 5B. The fourth downwardly deflected position might occur when frame 2A is suddenly displaced upwardly as might occur when the vehicle encounters a bump. Isolators 12 and 14 may be configured to have differing spring rates in the vertical and longitudinal directions. By way of example, isolators 12 and 14 may be arranged so that an operator weighing 200 lbs may notice seat 5 translates down approximately between ½ and 2 inches much as shown in FIG. 5B.

Figure 6A:
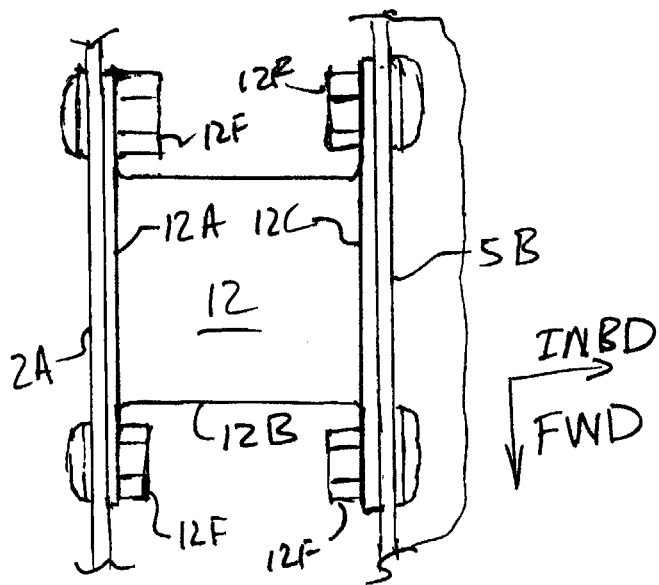
FIG. 6A is a top view of an isolator in a first neutral position.
Figure 6B:
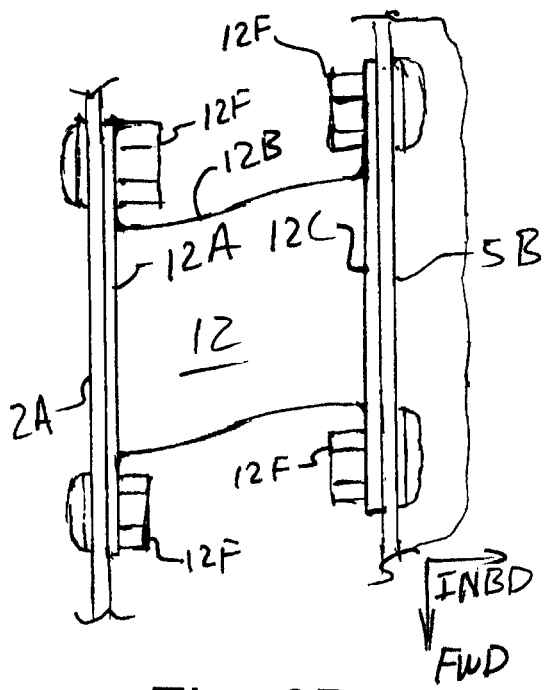
FIG. 6B is a top view of an isolator in a second rearwardly deflected position as might occur if the frame of the vehicle were to suddenly translate forward relative to the operator seat.
Figure 6C:
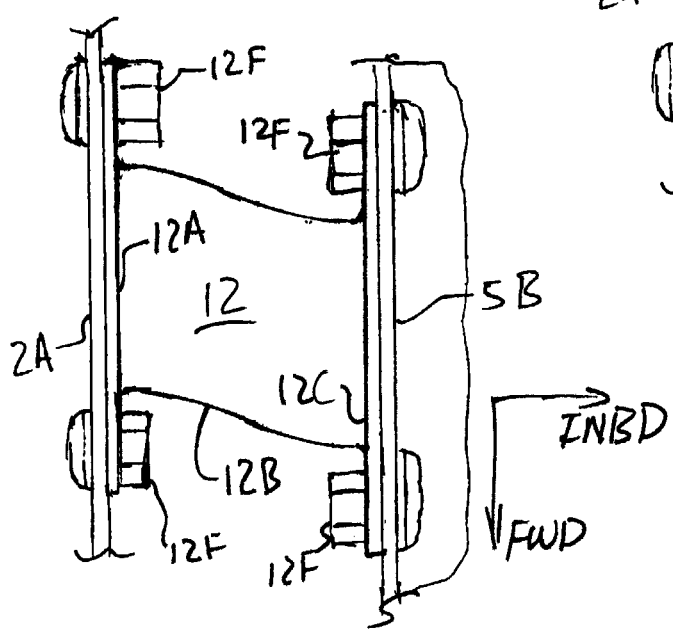
FIG. 6C is a top view of an isolator in a third forwardly deflected position as might occur if the frame of the vehicle were to suddenly translate backward relative to the operator seat.

FIGS. 6A-6C illustrate what occurs when relative longitudinal displacements occur between vehicle frame 2A and seat frame 5B. As can be seen in FIG. 6A, which is a top view of isolator 12, isolator 12 is in a first neutral position as might occur when the vehicle is not moving. In FIG. 6B, isolator 12 is in a second rearwardly deflected position as might occur when frame 2A suddenly accelerates forward relative to seat frame 5B as might occur when a short coupled vehicle in motion encounters a bump and the vehicle frame is rotating forward around a transverse axis. In FIG. 6C, isolator 12 is in a third forwardly deflected position as might occur when a short coupled vehicle in motion encounters a bump and the vehicle frame is rotating backward around a transverse axis. Such backward and forward displacements which occur with greater amplitudes in short wheel base vehicles causes the "back slap" condition noted above. By allowing operator seat 5 to be displaced in the longitudinal direction relative to frame 2A, backslap may be reduced or even substantially eliminated.

As can be seen in FIGS. 1 and 4, in this example, two optional dampeners 22 are connected between stanchions 20 mounted to frame 2 and the extreme rear corners of seat pan 5A. Dampeners 22 are pivotally mounted at both ends and are operable to dampen vertical oscillations of seat 5 and to a lesser degree to dampen longitudinal oscillations of seat 5. The dampening coefficient of the dampeners may be tuned to permit displacements to counter jolts in the ride, but to also minimize the oscillations of seat 5 after the vehicle encounters a bump.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An operator seat suspension for a terrain working vehicle, comprising:
    (a) a seat having a seat structure including at least one member that presents at least two spaced apart generally longitudinal upright surfaces which are fixed in relation to the seat,
    (b) at least one member which is at least indirectly fixed to a vehicle frame, the at least one member presenting two second generally longitudinal upright surfaces which are spaced apart from each other and which are spaced away from the first generally longitudinal upright surfaces of the seat structure, and,
    (c) a set of flexible elastomeric isolators connecting between the first generally longitudinal upright surfaces and the second generally longitudinal upright surfaces, the isolators operable to allow displacement in the vertical and the longitudinal directions between the seat and the vehicle frame.

2. The operator seat suspension of claim 1, further comprising at least one dampener connected between the vehicle frame and the seat structure, the dampener being arranged to dampen oscillations which are in the vertical and longitudinal directions.

3. The operator seat suspension of claim 1, further comprising at least one dampener connecting between the upper end of at least one generally upright stanchion fixed to the frame and the lower rear area of the seat structure, the dampener being arranged to dampen oscillations which are in the vertical and longitudinal directions.

4. The operator seat suspension of claim 1, further comprising at least two dampeners connecting between the upper ends of two spaced generally upright stanchions fixed to the frame and the lower rear area of the seat structure, each dampener being arranged to dampen oscillations which are in the vertical and longitudinal directions.

5. The operator seat suspension of claim 1, wherein:
    each isolator includes an outboard flange, an inboard flange and an elastomeric isolator body which is bonded to the inboard and outboard flanges, the inboard and outboard flanges each fixed to one of the first generally longitudinal upright surfaces associated with the seat structure and the second generally longitudinal upright surfaces associated with the vehicle frame.

6. The operator seat suspension of claim 1, wherein:
    each isolator includes an outboard flange, an inboard flange and an elastomeric isolator body which is bonded to the inboard and outboard flanges, the inboard and outboard flanges each fixed to one of the first generally longitudinal upright surfaces associated with the seat structure and the second generally longitudinal upright surfaces associated with the vehicle frame, and wherein,
    at least two dampeners connect between the upper ends of two spaced generally upright stanchions fixed to the frame and the lower rear area of the seat structure, each dampener being arranged to dampen oscillations which are in the vertical and longitudinal directions.

* * * * *